United States Patent
Zhao et al.

(10) Patent No.: US 9,813,953 B2
(45) Date of Patent: Nov. 7, 2017

(54) RADIO NETWORK NODE, A USER EQUIPMENT AND METHODS THEREIN

(75) Inventors: Wei Zhao, Stockholm (SE); Jingyi Liao, Solna (SE); Mikael Wittberg, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 65 days.

(21) Appl. No.: 14/408,611

(22) PCT Filed: Jul. 4, 2012

(86) PCT No.: PCT/SE2012/050775
§ 371 (c)(1),
(2), (4) Date: Dec. 17, 2014

(87) PCT Pub. No.: WO2014/007697
PCT Pub. Date: Jan. 9, 2014

(65) Prior Publication Data
US 2015/0172971 A1 Jun. 18, 2015

(51) Int. Cl.
*H04W 36/00* (2009.01)
*H04W 36/08* (2009.01)
*H04W 74/08* (2009.01)

(52) U.S. Cl.
CPC ... *H04W 36/0072* (2013.01); *H04W 36/0077* (2013.01); *H04W 36/08* (2013.01); *H04W 74/0833* (2013.01)

(58) Field of Classification Search
None
See application file for complete search history.

(56) References Cited

U.S. PATENT DOCUMENTS

| 2010/0232382 | A1  | 9/2010 | Gauvreau et al. |
| 2011/0105165 | A1* | 5/2011 | Sagfors ............. H04W 48/12 455/507 |
| 2011/0222501 | A1* | 9/2011 | Kim ................. H04L 1/0041 370/329 |
| 2012/0026976 | A1  | 2/2012 | Chang et al. |

(Continued)

OTHER PUBLICATIONS

3rd Generation Partnership Project, "3rd Generation Partnership Project; Technical Specification Group Radio Access Network; Evolved Universal Terrestrial Radio Access (E-UTRA); Radio Resource Control (RRC); Protocol specification (Release 10)", Technical Specification, 3GPP TS 36.331 V10.5.0, Mar. 1, 2012, pp. 1-302, 3GPP, France.

(Continued)

*Primary Examiner* — Chi H Pham
*Assistant Examiner* — Soon-Dong D Hyun
(74) *Attorney, Agent, or Firm* — Coats & Bennett, PLLC (57) ABSTRACT

A radio network node (RNN) (202) and a method therein, for handling of changing primary cell from a first cell (204) to a second cell (206) during re-selection of primary cell of a user equipment (UE) (208). The RNN is configured to serve the first cell, the UE is located within the first cell and is served by the RNN, and RNN and the UE are comprised in a communications system (200). The RNN transmits an RRCConnectionReconfiguration signal to the UE, which signal comprises an indication that the UE does not need to perform a random access procedure for the second cell when changing primary cell from the first cell to the second cell.

33 Claims, 8 Drawing Sheets

(56) References Cited

U.S. PATENT DOCUMENTS

| | | | | |
|---|---|---|---|---|
| 2012/0063421 A1* | 3/2012 | Wu | ............... | H04W 36/0066 |
| | | | | 370/332 |
| 2012/0135735 A1* | 5/2012 | Ponce De Leon | .... | H04W 36/30 |
| | | | | 455/436 |
| 2012/0135751 A1* | 5/2012 | Mishra | ............... | H04W 4/028 |
| | | | | 455/456.1 |
| 2013/0188473 A1* | 7/2013 | Dinan | ............... | H04W 56/0005 |
| | | | | 370/216 |
| 2014/0064133 A1* | 3/2014 | Kazmi | ............... | H04W 24/10 |
| | | | | 370/252 |
| 2015/0078286 A1* | 3/2015 | Kim | ............... | H04L 1/18 |
| | | | | 370/329 |

OTHER PUBLICATIONS

New Postcom, "Analysis of PCell change on single and multiple TA scenarios", 3GPP TSG RAN WG2 Meeting #72, Athens, Greece, Aug. 22, 2011, pp. 1-4, R2-114124, 3GPP.

Rapporteur (Samsung), "Introduction of Carrier Aggregation and UL / DL MIMO", Change Request for 36.331, 3GPP TSG-RAN WG2 Meeting #72, Jacksonville, US, Nov. 15, 2010, pp. 1-82, R2-106147, 3GPP.

Research in Motion, et al., "Component Carrier Management for Carrier Aggregation", 3GPP TSG RAN WG2 Meeting #68bis, Valencia, Spain, Jan. 18, 2009, pp. 1-4, R2-100414, 3GPP.

* cited by examiner

RADIO NETWORK NODE, A USER EQUIPMENT AND METHODS THEREIN

TECHNICAL FIELD

Embodiments herein relate to a radio network node, a user equipment and to methods therein. In particular, embodiments herein relate to a change of primary cell from a first cell to a second cell during re-selection of primary cell of the user equipment.

BACKGROUND

Communication devices such as User Equipments (UE) are enabled to communicate wirelessly in a radio communications system, sometimes also referred to as a radio communications network, a mobile communication system, a wireless communications network, a wireless communication system, a cellular radio system or a cellular system. The communication may be performed e.g. between two user equipments, between a user equipment and a regular telephone and/or between a user equipment and a server via a Radio Access Network (RAN) and possibly one or more core networks, comprised within the wireless communications network.

User equipments are also known as e.g. mobile terminals, wireless terminals and/or mobile stations, mobile telephones, cellular telephones, or laptops with wireless capability, just to mention some examples. The user equipments in the present context may be, for example, portable, pocket-storable, hand-held, computer-comprised, or vehicle-mounted mobile devices, enabled to communicate voice and/or data, via the RAN, with another entity.

The wireless communications network covers a geographical area which is divided into cell areas, wherein each cell area being served by a network node such as a Base Station (BS), e.g. a Radio Base Station (RBS), which sometimes may be referred to as e.g. eNB, eNodeB, NodeB, B node, or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several radio access and communication technologies. The base stations communicate over the radio interface operating on radio frequencies with the user equipments within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: GroupeSpécial Mobile).

In the context of this disclosure, the expression Downlink (DL) is used for the transmission path from the base station to the user equipment. The expression Uplink (UL) is used for the transmission path in the opposite direction i.e. from the user equipment to the base station.

In 3rd Generation Partnership Project (3GPP) Long Term Evolution (LTE), base stations, which may be referred to as eNodeBs or even eNBs, may be directly connected to one or more core networks.

In order to achieve very high data rates in LTE or LTE Advanced communications systems, it is necessary to increase the transmission bandwidths over those bandwidths that may be supported by a single carrier or channel. The method is termed carrier aggregation.

In carrier aggregation, the channels or carriers may be in contiguous elements of the spectrum, or they may be in different frequency bands.

Carrier aggregation is supported by both Frequency-Division Duplexing (FDD) LTE and Time-Division Duplexing (TDD) LTE. This ensures that both FDD LTE and TDD LTE are able to meet the high data throughput requirements that are placed upon them.

When carriers are aggregated, each carrier is referred to as a Component Carrier (CC). The component carrier may be divided into two different categories; primary component carrier and secondary component carrier. The primary component carrier is the main carrier in any group. There will be a downlink primary component carrier and an associated uplink primary component carrier. Further, there may be one or more secondary component carriers.

Accordingly, two categories of cells are defined for carrier aggregation, Primary Cell (PCell) and Secondary Cell (SCell).

The primary cell operates on a primary frequency. On the primary frequency, the user equipment either performs the initial connection (re)establishment procedure, or connect to the cell indicated as the primary cell in the handover procedure.

The secondary cell operates on a secondary frequency. The secondary frequency may be configured once a Radio Resource Control (RRC) connection is established between the user equipment and the communications system. Further, the secondary frequency may be used by the user equipment to provide additional radio resources.

For the primary cell the user equipment applies the system information acquisition and change monitoring procedures for the primary cell only. The primary cell may be regarded as the anchor carrier for the user equipment and is thus used for basic functionalities such as monitoring of radio link failures. As previously mentioned, if more than one component carrier is configured for the user equipment, the additional component carriers are denoted as secondary cells for the user equipment.

For a user equipment supporting carrier aggregation, E-UTRAN provides all system information relevant for operation in the concerned cell in the RRC_CONNECTED mode via dedicated signaling when adding a secondary cell. For secondary cells, change of system information is handled by release and addition of the concerned secondary cell. This may be done with a single RRCConnectionReconfiguration message.

In carrier aggregation, the user equipment may need to re-select primary cell due to changes in channel quality. For example, the user equipment may choose to re-select the current secondary cell as the primary cell when measurement results for the primary cell are worse than, e.g. below, a threshold while the secondary cell has a good channel quality, i.e. when the measurement result for the secondary cell is better than, e.g. above, a threshold.

For user equipments supporting carrier aggregation, E-UTRAN may change primary cell by means of a handover procedure using an RRCConnectionReconfiguration message including the mobilityControlInfo.

Figure 1:
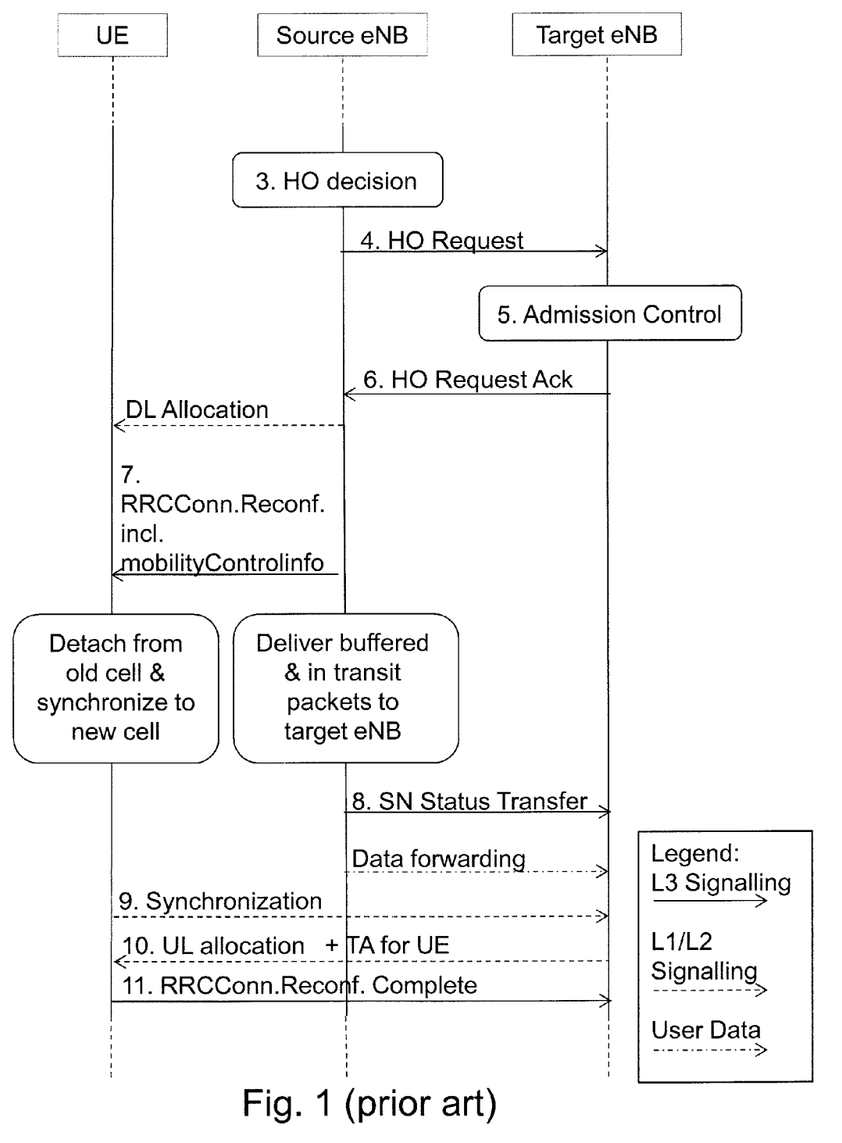
FIG. 1 is a schematic flow chart of steps 3-11 of the prior art primary cell re-selection using a handover procedure.

FIG. 1 schematically illustrates the steps 3-11 of the prior art primary cell re-selection using the handover procedure according to 36331-a50, 3GPP, Technical specification group radio access network, Evolved Universal Terrestrial Radio Access (E-UTRA), Radio Resource Control (RRC), protocol specification (Release 10). For clarity reasons, the steps 1-2 and 12-18 have been excluded in FIG. 1.

In this procedure, in the context of the user equipment choosing to re-select the secondary cell as the primary cell, a user equipment measurement report, e.g an RSRP for a serving cell and a neighbor cell, is sent from the user equipment to the serving eNB (source eNB, S-eNB), which is the eNB controlling the current primary cell. If one or more criterias for cell re-selection is met, the S-eNB sends a Handover (HO) request to the target eNB (T-eNB) in step 4 and receives an HO Request acknowledgement (ACK) from the target eNB (T-eNB) in step 6. In the described scenario, the target eNB is the eNB controlling the current secondary cell. In step 7, the S-eNB sends an RRCConnectionReconfiguration message to the user equipment, and in steps 9 and 10 the user equipment synchronizes to the T-eNB by using the Random Access Channel (RACH). After that, in step 11, the user equipment sends an RRCConnectionReconfiguration Complete message to the T-eNB and starts to use the previous secondary cell as the primary cell. This concludes the primary cell reselection procedure. After completion of the primary cell re-selection procedure, the previous primary cell may be used by the user equipment as a secondary cell. This may be achieved by including the previous primary cell into a secondary cell list Information Element (IE) comprised in the RRCConnectionReconfiguration message.

However, this process has shown to be time-consuming and the user equipment may lose its connection during this process.

SUMMARY

An object of embodiments herein is to provide a way of improving the performance in a communications network.

According to a first aspect of embodiments herein, the object is achieved by a method in a radio network node for handling of changing primary cell from a first cell to a second cell during re-selection of primary cell of a user equipment.

The radio network node is configured to serve the first cell, and the user equipment is located within the first cell and served by the radio network node. Further, the radio network node and the user equipment are comprised in a communications system.

The radio network node transmits an RRCConnectionReconfiguration signal to the user equipment. The RRCConnectionReconfiguration signal comprises an indication that the user equipment does not need to perform a random access procedure for the second cell when changing primary cell from the first cell to the second cell.

Further, the radio network node receives an acknowledgement from the user equipment. The acknowledgement acknowledges receipt of the RRCConnectionReconfiguration signal.

Furthermore, the radio network node transmits uplink allocation information for the second cell to the user equipment.

According to a second aspect of embodiments herein, the object is achieved by a radio network node for handling changing primary cell from a first cell to a second cell during re-selection of primary cell of a user equipment.

The radio network node is configured to serve the first cell, and the user equipment is located within the first cell and served by the radio network node. Further, the radio network node and the user equipment are comprised in a communications system.

The radio network node comprises a transmitting circuit configured to transmit an RRCConnectionReconfiguration signal to the user equipment. The RRCConnectionReconfiguration signal comprises an indication that the user equipment does not need to perform a random access procedure for the second cell when changing primary cell from the first cell to the second cell.

Further, the radio network node comprises a receiving circuit configured to receive an acknowledgement from the user equipment. The acknowledgement acknowledges receipt of the RRCConnectionReconfiguration signal.

The transmitting circuit is further configured to transmit uplink allocation information for the second cell to the user equipment.

According to a third aspect of embodiments herein, the object is achieved by a method in a user equipment for changing primary cell from a first cell to a second cell during re-selection of primary cell of the user equipment.

The radio network node is configured to serve the first cell, and the user equipment is located within the first cell and served by the radio network node. Further, the radio network node and the user equipment are comprised in a communications system.

The user equipment receives an RRCConnectionReconfiguration signal from the radio network node. The RRCConnectionReconfiguration signal comprises an indication that the user equipment does not need to perform a random access procedure for the second cell when changing primary cell from the first cell to the second cell.

Further, the user equipment transmits an acknowledgement from the user equipment. The acknowledgement acknowledges receipt of the RRCConnectionReconfiguration signal.

Furthermore, the user equipment receives uplink allocation information for the second cell from the radio network node.

According to a fourth aspect of embodiments herein, the object is achieved by a user equipment for changing primary cell from a first cell to a second cell during re-selection of primary cell of the user equipment.

The radio network node is configured to serve the first cell, and the user equipment is located within the first cell and served by the radio network node. Further, the radio network node and the user equipment are comprised in a communications system.

The user equipment comprises a receiving circuit configured to receive an RRCConnectionReconfiguration signal from the radio network node. The RRCConnectionReconfiguration signal comprises an indication that the user equipment does not need to perform a random access procedure for the second cell when changing primary cell from the first cell to the second cell.

Further, the user equipment comprises a transmitting circuit configured to transmit an acknowledgement from the user equipment. The acknowledgement acknowledges receipt of the RRCConnectionReconfiguration signal.

The receiving circuit is further configured to receive uplink allocation information for the second cell from the radio network node.

Since the RRCConnectionReconfiguration signal comprises an indication that the user equipment does not need to perform a random access procedure, an unnecessary random access procedure will not be performed by the user equipment. This results in an improved performance in the communications system.

An advantage of embodiments herein is that the user equipment will not perform an unnecessary random access procedure when performing primary cell re-selection. This reduces the primary cell re-selection delay and eliminates the potential failure due to the random access procedure and as a result improves the user experience and the Key Performance Indicators (KPIs) of the communications system.

A further advantage of embodiments herein is that, from the communications system side, embodiments herein provides for the reduction of resource usage that is consumed by an unnecessary random access procedure and thereby the performance of the communications system is improved.

BRIEF DESCRIPTION OF THE DRAWINGS

Examples of embodiments herein are described in more detail with reference to attached drawings in which.

DETAILED DESCRIPTION

As part of developing embodiments herein, a problem will first be identified and discussed.

The prior art primary cell re-selection described above with reference to FIG. 1 comprises a random access procedure.

However, when the user equipment is re-selecting the previous secondary cell as the primary cell, the user equipment may already be uplink synchronized with the secondary cell. This makes the random access process unnecessary. An unnecessary random access procedure may have several impacts.

For example, to the user equipment, an extra random access procedure may introduce extra delay. Further, when the random access procedure fails due to various reasons, such as interferences, resource limitations, etc, the user equipment will be forced to lose its connection, which has negative impact on both the user experience and the operator Key Performance Indicators (KPIs).

As another example, from the communications system side, an extra, unnecessary, random access procedure unnecessarily takes up communications system resources, which impacts the system performance and may prevent other user equipments from accessing the communications system.

Thus, an aim of embodiments described herein is to remove the unnecessary random access procedure in primary cell re-selection.

In the scenario described in the background section above, i.e., when the user equipment is re-selecting a previous secondary cell as its primary cell, the current radio network node serving the current primary cell knows whether or not the user equipment is uplink synchronized with the current secondary cell, i.e., with the radio network node serving the current secondary cell.

Embodiments herein will be exemplified in the following non-limiting description.

According to embodiments herein, if the user equipment is uplink synchronized with the current secondary cell, the serving radio network node may then indicate to the user equipment in an RRCConnectionReconfiguration signal that no random access process is needed. Thus, the user equipment may skip the random access procedure. Since the random access procedure is not used, the target radio network node may use other means to supply uplink allocation information to the user equipment. The uplink allocation information may comprise the uplink resources the user equipment is to use for the RRCConnectionReconfigurationComplete signal.

Figure 2:
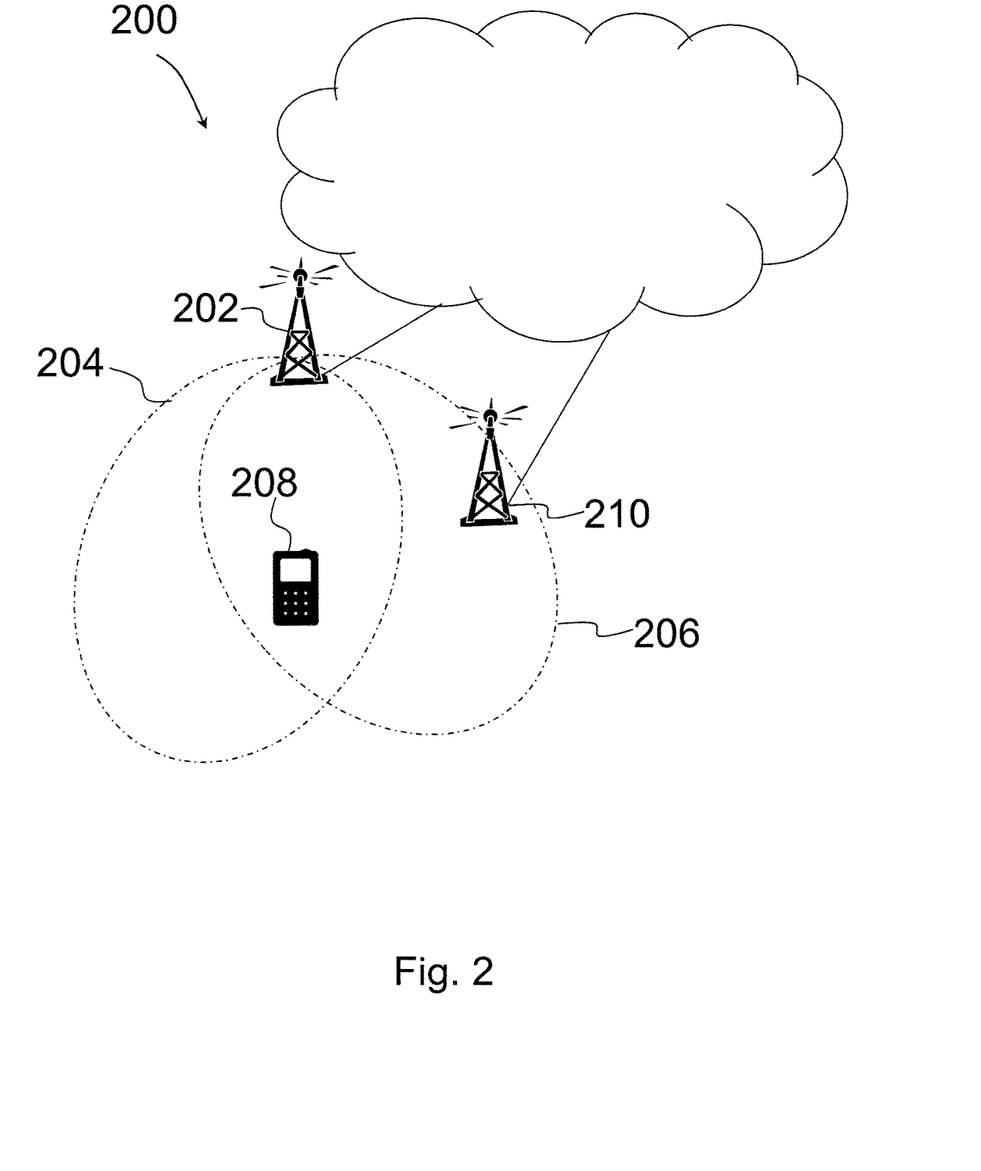
FIG. 2 is a schematic block diagram illustrating embodiments of a communications system.

FIG. 2 schematically illustrates embodiments of a radio communications system 200. The radio communication system 200 may be a 3GPP communications system or a non-3GPP communications system. The radio communications system 200 may comprises one or more of radio communications networks (not shown). Each radio communications network may be configured to support one or more Radio Access Technologies (RATs). Further, the one or more radio communications networks may be configured to support different RATs. Some examples of RATs are GSM, WCDMA, and LTE.

The radio communications system 200 comprises a radio network node 202, herein sometimes also referred to as a first radio network node 202. The radio network node 202 may be a base station such as an eNB, an eNodeB, Node B or a Home Node B, a Home eNode B, a radio network controller, a base station controller, an access point, a relay node (which may be fixed or movable), a donor node serving a relay, a GSM/EDGE radio base station, a Multi-Standard Radio (MSR) base station or any other network unit capable to serve a user equipment in the cellular communications system 200.

Further, the radio network node 202 provides radio coverage over at least one cell 204, 206. In FIG. 2, the radio network node 202 is illustrated to provide radio coverage over a first cell 204. The radio network node 202 may further provide radio coverage over a second cell 206.

In a communications system comprising carrier aggregation, a primary cell, e.g. the first cell 204, may operate on a primary frequency and a secondary cell, e.g. the second cell 206, may operate on a secondary frequency.

The radio communications system 200 comprises further a user equipment 208. The user equipment 208 is located within the first cell 204 and is served by the radio network node 202. Further, the user equipment 208 transmits data over a radio interface to the radio network node 202 in an uplink (UL) transmission and the radio network node 202 transmits data to the user equipment 208 in a downlink (DL) transmission.

The first user equipment 208 may be e.g. a mobile terminal or a wireless terminal, a mobile phone, a computer such as e.g. a laptop, a tablet pc such as e.g. an iPad™, a Personal Digital Assistant (PDA), or any other radio network unit capable to communicate over a radio link in a cellular communications network. The first user equipment 208 may further be configured for use in both a 3GPP network and in a non-3GPP network.

Further, the radio communications system 200 may comprise a second radio network node 210. The second radio network node 210 may be a base station such as an eNB, an eNodeB, Node B or a Home Node B, a Home eNode B, a radio network controller, a base station controller, an access point, a relay node (which may be fixed or movable), a donor node serving a relay, a GSM/EDGE radio base station, a Multi-Standard Radio (MSR) base station or any other network unit capable to serve a user equipment in the cellular communications system 200.

The second radio network node 210 may provide radio coverage over the second cell 206.

The current radio network node, e.g. the first radio network node 202, serving the current primary cell, e.g. the first cell 204, is herein sometimes also referred to as serving radio network node, serving e-NB, source eNB, or S-eNB. Further, the radio network node, e.g. the first radio network node 202 or the second radio network node 210, serving the current secondary cell, e.g. the second cell 206, is herein sometimes also referred to as target radio network node, target eNB or T-eNB.

Figure 3:
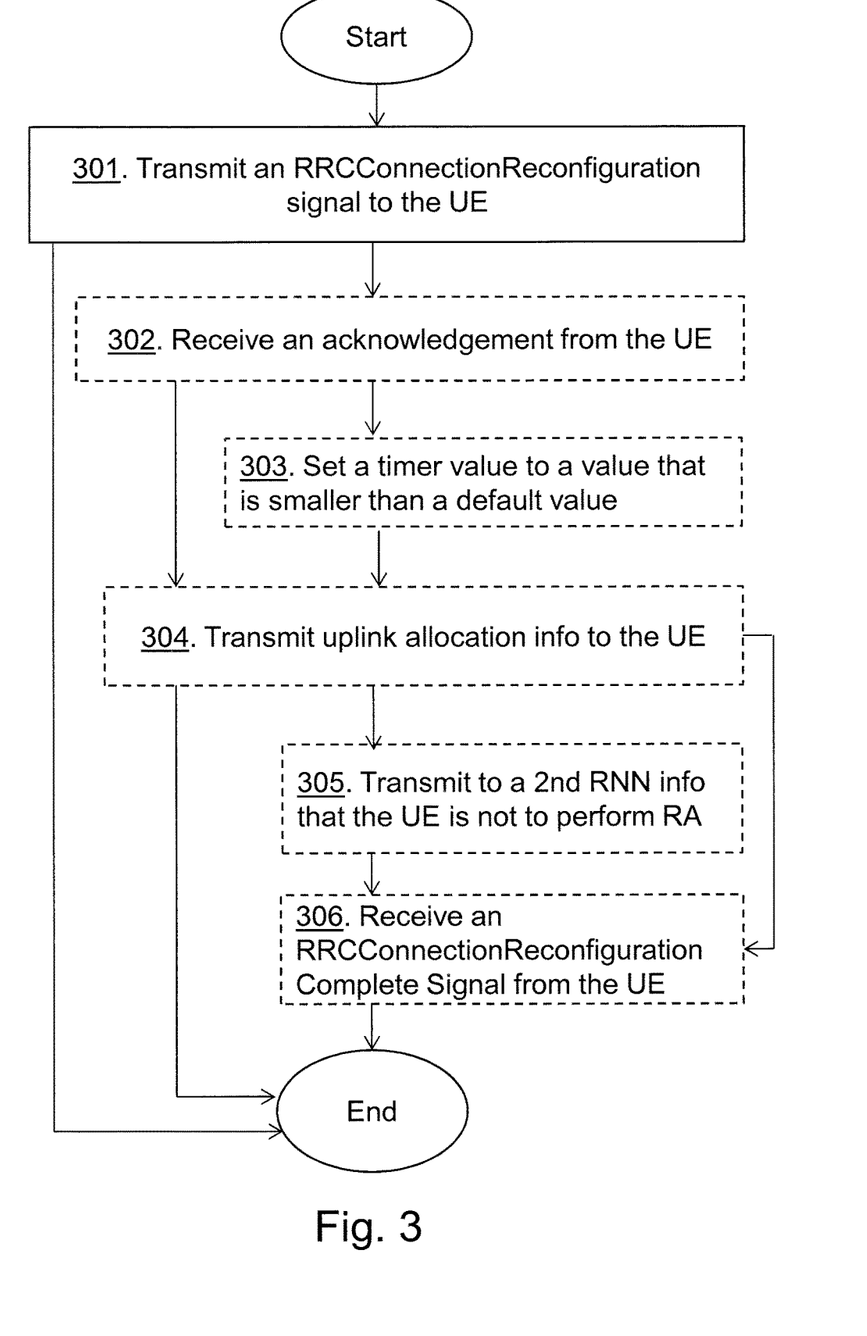
FIG. 3 is a flowchart depicting embodiments of a method in a radio network node.
Figure 7:
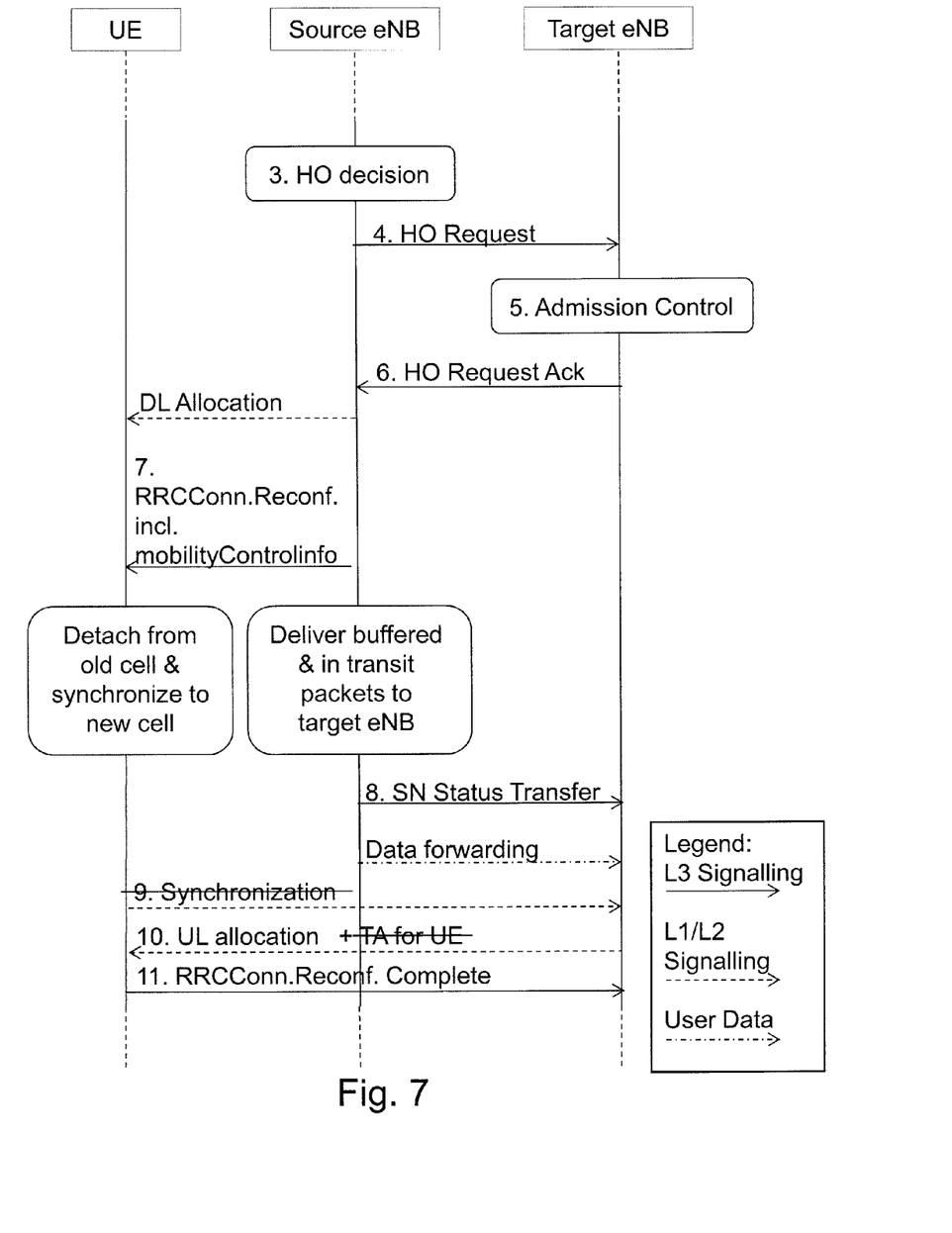
FIG. 7 is a schematic flow chart of steps 3-11 of a modified primary cell re-selection using a handover procedure.

A method in the radio network node 202 for handling of changing primary cell from a first cell 204 to a second cell 206 during re-selection of primary cell of a user equipment 208 will now be described with reference to FIG. 3 and FIG. 7. FIG. 7 schematically illustrates a modified primary cell re-selection using the handover procedure according to some embodiments described herein.

As previously mentioned, the radio network node 202 is configured to serve the first cell 204. Further, the user equipment 208 is located within the first cell 204 and is served by the radio network node 202. Furthermore, the radio network node 202 and the user equipment 208 are comprised in the communications system 200.

When the communications system 200 comprises carrier aggregation, the first cell 204 may be a primary cell operating on a primary frequency and the second cell 206 may be a secondary cell operating on a secondary frequency. After re-selection of primary cell, the frequency on which the new primary cell is operating on is considered to be the primary frequency. Correspondingly, after re-selection of primary cell, the frequency on which the new secondary cell is operating on is considered to be the secondary frequency.

The method comprises the following actions, which actions do not have to be performed in the order stated below, but may be taken in any suitable order. Further, actions may be combined. Optional actions are indicated by dashed boxes.

Action 301

In order to inform the user equipment 208 that a re-selection of the primary cell is possible, the radio network node 202 transmits an RRCConnectionReconfiguration signal to the user equipment 208. This relates to step 7 in FIG. 7.

Further, as illustrated in FIG. 7, the radio network node 202 may transmit the RRCConnectionReconfiguration signal to the user equipment 208 when the radio network node 202 in step 6 has received a Handover Request Acknowledgement signal from the radio network node 202 serving the cell that is to be the primary cell.

The RRCConnectionReconfiguration signal comprises an indication that the user equipment 208 does not need to perform a random access procedure for the second cell when changing primary cell from the first cell to the second cell, i.e. when performing the re-selection of primary cell. This means that step 9 in FIG. 7 is excluded. Therefore, in FIG. 7, step 9 has been strikethrough.

In some embodiments, the radio network node 202 transmits the RRCConnectionReconfiguration signal when the radio network node 202 knows that the user equipment 208 is synchronised with the second cell 206.

When used herein, by the expression "user equipment 208 is synchronised with a cell, e.g. the second cell 206" is meant that the user equipment 208 is synchronized in uplink with the cell and especially that the user equipment 208 is synchronized in uplink with the radio network node serving the cell. In case the cell is the second cell 206, the user equipment 208 is synchronized in uplink with the radio network node serving the second cell 206. In this description, the second cell 206 may be served by the radio network node 202 or by the second radio network node 210.

The indication may be comprised in a control information element of the RRCConnectionReconfiguration signal.

In some embodiments, the control information element is a mobility control information element of the RRCConnectionReconfiguration signal. In such embodiments, the indication may be comprised in a rach-ConfigDedicated information element of the mobility control information element.

However, it should be understood that the indication may be comprised in any other existing non-specific or specific control information element, or in any future control information element.

Action 302

The radio network node 202 may receive an acknowledgement from the user equipment 208. The acknowledgement acknowledges receipt of the RRCConnectionReconfiguration signal by the user equipment 208.

Action 303

Since no random access procedure is needed to be performed, and in order to transmit uplink allocation information as early as possible, the radio network node 202 may be configured to set a timer value to a value that is smaller than a default value. The expiry of the timer value may then trigger the transmission of uplink allocation information mentioned in Action 304 below.

In the current version of the standard (36331-a50, 3GPP, Technical specification group radio access network, evolved universal terrestrial radio access(E-UTRA), Radio Resource Control (RRC), protocol specification (Release 10)), the default value is set to 50 ms. Thus, in some embodiments described herein, the timer value is set to a value that is smaller than 50 ms.

In some embodiments, the radio network node 202 sets the timer value when it knows that a primary cell re-selection is to be performed, e.g. when the radio network node 202 has received the acknowledgement from the user equipment 208.

Action 304

In order to inform the user equipment 208 about the uplink resources it may use, the radio network node 202 may transmit uplink allocation information for the second cell 206 to the user equipment 208. This relates to step 10 in FIG. 7. However, since no random access procedure is needed, the radio network node 202 does not need to transmit the Timing Advance (TA) for the user equipment 208 to the user equipment 208. Therefore, in step 10 of FIG. 7, "TA for UE" has been strikethrough.

In some embodiments, the uplink allocation information comprises an uplink grant. The uplink grant defines uplink resources the user equipment 208 may use for uplink transmission.

Further, in some embodiments, wherein the radio network node 202 further is configured to serve the second cell 206, the uplink allocation information comprises an uplink allocation, which uplink allocation defines uplink resources the user equipment 208 may use for uplink transmission.

Action 305

In some embodiments, wherein the radio network node 202 is a first radio network node serving the first cell 204 and wherein the second cell 206 is served by a second radio network node 210, the radio network node 202 may transmit information to the second radio network node 210. The information may inform the second radio network node 210 that the user equipment 208 is not to perform the random access procedure.

The radio network node 202 may transmit the information together with a Sequence Number (SN) status transfer message to the second radio network node 210.

In some embodiments, this information should be transmitted before step 10 in FIG. 7. As illustrated in FIG. 7, the radio network node 202 may transmit the SN Status Transfer message to the second radio network node 210 in step 8.

The information may be carried in a negotiation procedure between the radio network node 202 and the second radio network node 210 in e.g. the SN status transfer message. The second radio network node 210 may then schedule a new uplink grant for the user equipment 208 when it receives the SN status transfer message from the radio network node 202.

It should be understood that, when the SN status transfer message is received by the second radio network node 210 that means that the radio network node 202 is no longer scheduling the user equipment 208, and that the user equipment 208 has been informed through the RRCConnectionReconfiguration signal about the new primary cell and about the specific configuration for the primary cell. Since the user equipment 208 will not listen on system information for the primary cell, the primary cell specific parameters have already been provided to the user equipment 208 in the RRCConnectionReconfiguration signal at step 7 of FIG. 7. This means that the user equipment 208 is currently monitoring the new primary cell for any Physical Dedicated Control Channel (PDCCH) requests, and hence the second radio network node 210 should send an uplink grant to the user equipment 208. Upon receipt of the uplink grant, the user equipment 208 will transmit the RRCConnectionReconfigurationComplete signal to the second radio network node 210. The event triggering the transmission of the uplink grant from the radio network node serving the new primary cell may be a timer expiry as described in relation to Action 303 above.

Action 306

When the radio network node 202 is the serving radio network node of the second cell 206, the radio network node 202 may further receive an RRCConnectionReconfigurationComplete signal from the user equipment 208.

The RRCConnectionReconfigurationComplete signal informs the radio network node 202 that the second cell 206 now is the primary cell.

This relates to step 11 of FIG. 7.

Figure 4:
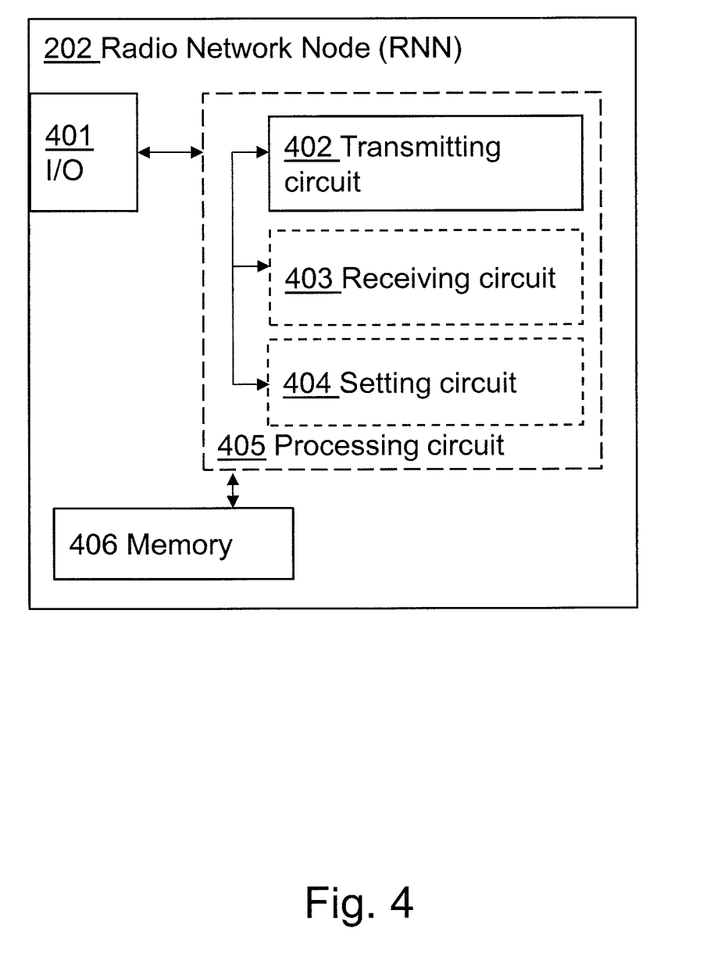
FIG. 4 is a schematic block diagram illustrating embodiments of a radio network node.

To perform the method actions in the radio network node 202 described above in relation to FIG. 3, the radio network node 202 comprises the following arrangement depicted in FIG. 4.

As previously mentioned, the radio network node 202 is configured to serve the first cell 204. Further, the user equipment 208 is located within the first cell 204 and is served by the radio network node 202. Furthermore, the radio network node 202 and the user equipment 208 are comprised in the communications system 200.

Further, as previously mentioned, when the communications system 200 comprises carrier aggregation, the first cell 204 may be a primary cell operating on a primary frequency and the second cell 206 may be a secondary cell operating on a secondary frequency.

The radio network node 202 comprises an input and output port 401 configured to function as an interface for communication in the communication system 200. The communication may for example be communication with the user equipment 208.

Further, the radio network node 202 comprises a transmitting circuit 402 configured to transmit an RRCConnectionReconfiguration signal to the user equipment 208.

The RRCConnectionReconfiguration signal comprises an indication that the user equipment 208 does not need to perform a random access procedure for the second cell when changing primary cell from the first cell to the second cell.

The indication may be comprised in a control information element of the RRCConnectionReconfiguration signal.

In some embodiments, the control information element is a mobility control information element of the RRCConnectionReconfiguration signal. In such embodiments, the indication may be comprised in a rach-ConfigDedicated information element of the mobility control information element.

However, as previously mentioned, it should be understood that the indication may be comprised in any other existing non-specific or specific control information element, or in any future control information element.

The transmitting circuit 402 may further be configured transmit uplink allocation information for the second cell 206 to the user equipment 208.

The uplink allocation information may comprise an uplink grant, which uplink grant defines the uplink resources the user equipment 208 may use for uplink transmission.

In some embodiments, wherein the radio network node 202 further is configured to serve the second cell 206, the uplink allocation information may comprise an uplink allocation, which uplink allocation defines the uplink resources the user equipment 208 may use for uplink transmission.

Further, the transmitting circuit 402 may be configured to transmit the RRCConnectionReconfiguration signal when the radio network node 202 knows that the user equipment 208 is synchronised with the second cell 206.

In some embodiments, wherein the radio network node 202 is a first radio network node serving the first cell 204 and wherein the second cell 206 is served by a second radio network node 210, the transmitting circuit 402 is further configured to transmit information to the second radio network node 210.

The information informs the second radio network node 210 that the user equipment 208 is not to perform the random access procedure.

The transmitting circuit 402 may further be configured to transmit the information together with a sequence number status transfer message to the second radio network node 210.

A receiving circuit 403 may further be comprised in the radio network node 202. The receiving circuit 403 is configured to receive an acknowledgement from the user equipment 208. The acknowledgement acknowledges receipt of the RRCConnectionReconfiguration signal by the user equipment 208.

The receiving circuit 403 may further be configured to receive an RRCConnectionReconfigurationComplete signal from the user equipment 208. This may be the case when the radio network node 202 is the serving radio network node of the second cell 206.

The RRCConnectionReconfigurationComplete signal informs the radio network node 202 about the completion of the primary cell re-selection and that the second cell 206 now is the primary cell.

In some embodiments, the radio network node 202 comprises a setting circuit 404. The setting circuit 404 is configured to set a timer value to a value that is smaller than a default value since no random access procedure is needed to be performed.

As previously mentioned, in the current version of the standard (36331-a50, 3GPP, Technical specification group radio access network, evolved universal terrestrial radio access (E-UTRA), Radio Resource Control (RRC), protocol specification (Release 10)), the default value is set to 50 ms. Thus, in some embodiments described herein, the timer value is set to a value that is smaller than 50 ms.

Embodiments herein for changing primary cell from a first cell 204 to a second cell 206 during re-selection of primary cell of a user equipment 208 may be implemented through one or more processors, such as a processing circuit 405 in the radio network node 202 depicted in FIG. 4, together with computer program code for performing the functions and/or method actions of embodiments herein.

It should be understood that one or more of the circuits comprised in the radio network node 202 described above may be integrated with each other to form an integrated circuit.

The radio network node 202 may further comprise a memory 406. The memory may comprise one or more memory units and may be used to store for example data such as thresholds, predefined or pre-set information, etc.

Figure 5:
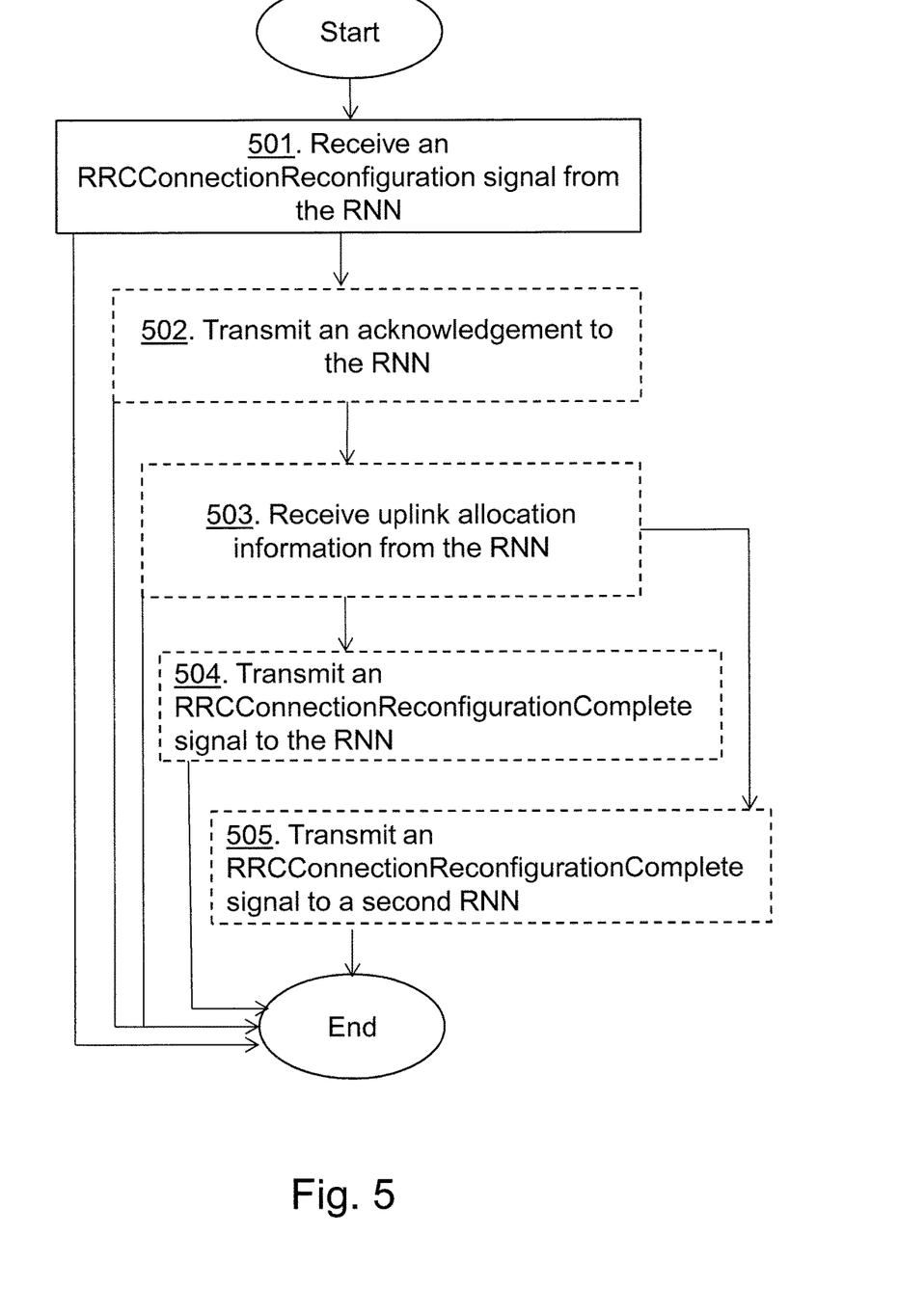
FIG. 5 is a flowchart depicting embodiments of a method in a user equipment.

A method in the user equipment 208 for changing primary cell from a first cell 204 to a second cell 206 during re-selection of primary cell of the user equipment 208 will now be described with reference to FIG. 5.

As previously mentioned, the radio network node 202 is configured to serve the first cell 204. Further, the user equipment 208 is located within the first cell 204 and is served by the radio network node 202. Furthermore, the radio network node 202 and the user equipment 208 are comprised in the communications system 200.

Further, as previously mentioned, when the communications system 200 comprises carrier aggregation, the first cell 204 may be a primary cell operating on a primary frequency and the second cell 206 may be a secondary cell operating on a secondary frequency.

The method comprises the following actions, which actions do not have to be performed in the order stated below, but may be taken in any suitable order. Further, actions may be combined. Optional actions are indicated by dashed boxes.

Action 501

In order to get knowledge that a re-selection of the primary cell is possible, the user equipment 208 receives an RRCConnectionReconfiguration signal from the radio network node 202. This relates to step 7 in FIG. 7.

The RRCConnectionReconfiguration signal comprises an indication that the user equipment 208 does not need to perform a random access procedure for the second cell when changing primary cell from the first cell to the second cell, i.e. when performing the re-selection of the primary cell. This means that step 9 in FIG. 7 is excluded. Therefore, in FIG. 7, step 9 has been strikethrough.

Action 502

In order to confirm receipt of the RRCConnectionReconfiguration signal, the user equipment 208 may transmit an acknowledgement to the radio network node 202. The acknowledgement thus acknowledges receipt of the RRCConnectionReconfiguration signal.

Action 503

In order to receive information about uplink resources that may be used for uplink transmission, the user equipment 208 may receive uplink allocation information from the radio network node 202. In some embodiments, when the second cell 206 is served by the second radio network node 210, the user equipment 208 may receive uplink allocation information from the second radio network node 210. This relates to step 10 of FIG. 7. However, since the user equipment 208 is already in synchronisation with both the first and second cells 204,206, no random access procedure is needed, the radio network node 202 does not need to transmit the Timing Advance (TA) for the user equipment 208 to the user equipment 208. Therefore, in step 10 of FIG. 7, "TA for UE" has been strikethrough.

Action 504

In some embodiments, wherein the second cell 206 is served by the radio network node 202, the user equipment 208 transmits an RRCConnectionReconfigurationComplete signal to the radio network node 202 when the primary cell re-selection is completed. The RRCConnectionReconfigurationComplete signal is transmitted based on the received uplink allocation information. The RRCConnectionReconfigurationComplete signal informs the radio network node 202 about the completion of the primary cell re-selection and that the second cell 206 now is the primary cell. This relates to step 11 of FIG. 7.

Action 505

In some embodiments, wherein the radio network node 202 is a first radio network node serving the first cell 204 and wherein the second cell 206 is served by a second radio network node 210, the user equipment 208 transmits an RRCConnectionReconfigurationComplete signal to the second radio network node 210 when the primary cell re-selection is completed.

The RRCConnectionReconfigurationComplete signal is transmitted based on the received uplink allocation information. The RRCConnectionReconfigurationComplete signal informs the second radio network node 210 about the completion of the primary cell re-selection selection and that the second cell 206 now is the primary cell. This relates to step 11 of FIG. 7.

Figure 6:
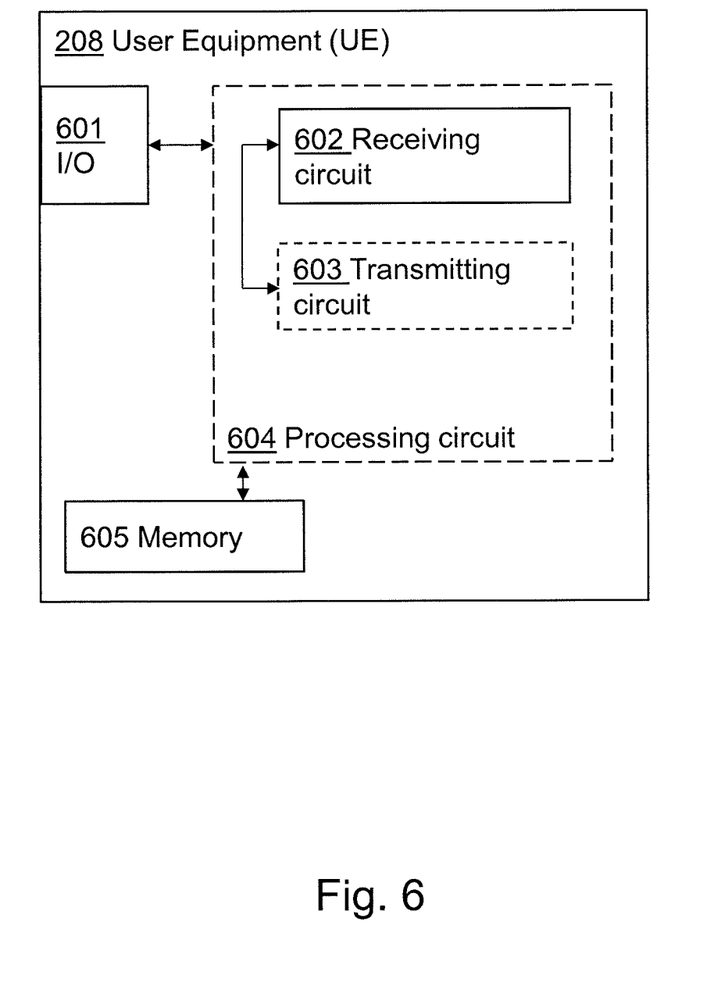
FIG. 6 is a schematic block diagram illustrating embodiments of a user equipment.

To perform the method actions in the user equipment 208 described above in relation to FIG. 5, the user equipment 208 comprises the following arrangement depicted in FIG. 6.

As previously mentioned, the radio network node 202 is configured to serve the first cell 204. Further, the user equipment 208 is located within the first cell 204 and is served by the radio network node 202. Furthermore, the radio network node 202 and the user equipment 208 are comprised in the communications system 200.

Further, as previously mentioned, when the communications system 200 comprises carrier aggregation, the first cell 204 may be a primary cell operating on a primary frequency and the second cell 206 may be a secondary cell operating on a secondary frequency.

The user equipment 208 comprises an input and output port 601 configured to function as an interface for communication in the communication system 200. The communication may for example be communication with the radio network node 202 or with a second radio network node 210.

A receiving circuit 602 is comprised in the user equipment 208. The receiving circuit 602 is configured to receive an RRCConnectionReconfiguration signal from the radio network node 202.

The RRCConnectionReconfiguration signal comprises an indication that the user equipment 208 does not need to perform a random access procedure for the second cell when changing primary cell from the first cell to the second cell.

The receiving circuit 602 may further be configured to receive uplink allocation information for the second cell 206 from the radio network node 202.

In some embodiments, wherein the second cell 206 is served by the radio network node 202, the transmitting circuit 603 is further configured to transmit an RRCConnectionReconfigurationComplete signal to the radio network node 202.

The RRCConnectionReconfigurationComplete signal may be transmitted based on the received uplink allocation information.

When the radio network node 202 is a first radio network node serving the first cell 204 and when the second cell 206 is served by a second radio network node 210, the transmitting circuit 603 may further be configured to transmit an RRCConnectionReconfigurationComplete signal to the second radio network node 210.

The RRCConnectionReconfigurationComplete signal may be transmitted based on the received uplink allocation information.

The user equipment 208 may further comprise a transmitting circuit 603 configured to transmit an acknowledgement to the radio network node 202.

The acknowledgement acknowledges receipt of the RRCConnectionReconfiguration signal by the user equipment 208.

Embodiments herein for changing primary cell from a first cell 204 to a second cell 206 during re-selection of primary cell of the user equipment 208 may be implemented through one or more processors, such as a processing circuit 605 in the user equipment 208 depicted in FIG. 6, together with computer program code for performing the functions and/or method actions of embodiments herein.

It should be understood that one or more of the circuits comprised in the user equipment 208 described above may be integrated with each other to form an integrated circuit.

The user equipment 208 may further comprise a memory 605. The memory may comprise one or more memory units and may be used to store for example data such as thresholds, predefined or pre-set information, etc.

Figure 8:
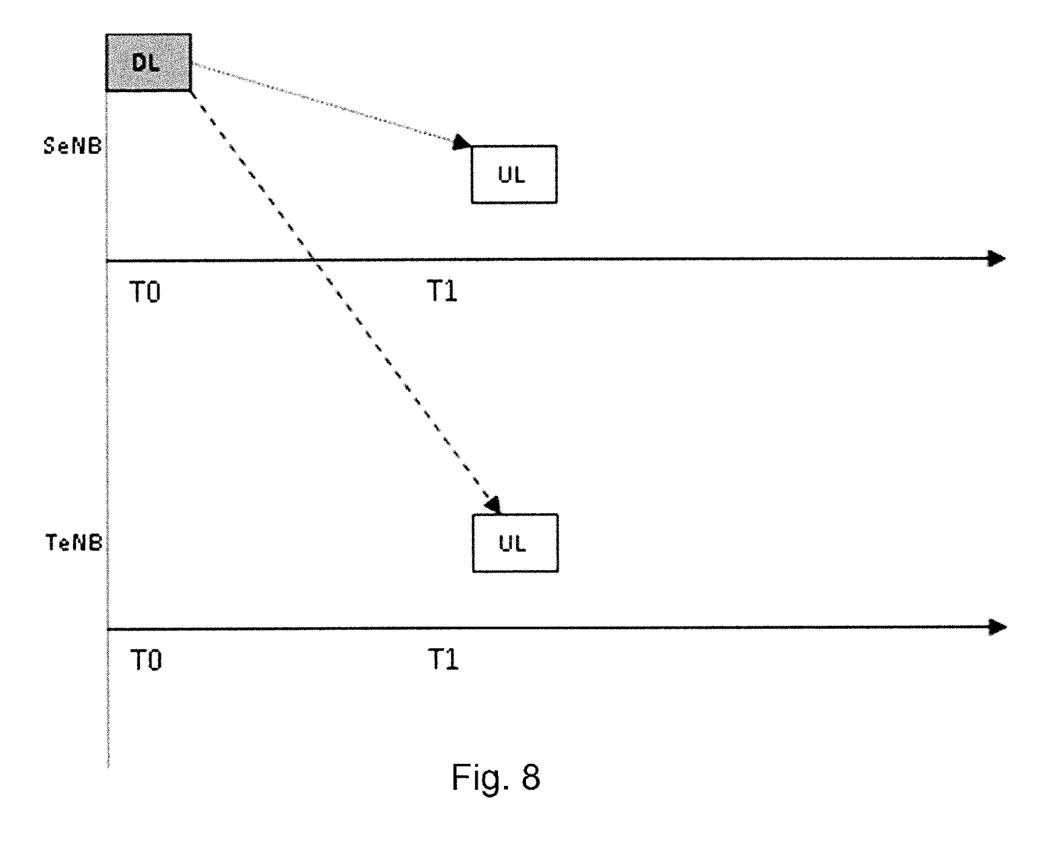
FIG. 8 is a schematic illustration of a cross-scheduling example.

FIG. 8 schematically illustrates a cross-scheduling example which may be used in some embodiments. In the illustrated example, uplink allocation is performed by the radio network node 202,210 (S-eNB) serving the second cell 206. If cross-scheduling is supported by the first cell 204 and the second cell 206 before the primary cell re-selection occurs, the uplink allocation may be performed by the radio network node 202,210 serving the second cell 206 (S-eNB) using a cross-scheduling solution.

For example, as illustrated in FIG. 8, at a point of time T0, when the radio network node 202,210 serving the second cell 206 (S-eNB) sends the RRCConnectionReconfiguration signal (illustrated with DL in FIG. 8) to the user equipment 208, the uplink allocation for the radio network node 202 serving the first cell (T-eNB) may be carried in an information element comprised in the RRCConnectionReconfiguration signal. This uplink allocation is the uplink grant for the RRCConnectionReconfigurationComplete signal (illustrated with UL in FIG. 8) in the user equipment's 208 uplink transmission to the radio network node 202,210 serving the second cell 206. This uplink transmission is performed at a point of time T1. Thus, both step 9 and step 10 of FIG. 7 may be skipped. Thereby, the primary cell re-selection delay may be further reduced in terms of several ms.

Although the description above contains many specifics, they should not be construed as limiting but as merely providing illustrations of some presently preferred embodiments. The technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

When using the word "comprise" or "comprising" it shall be interpreted as non-limiting, in the meaning of consist at least of.

When using the word action/actions it shall be interpreted broadly and not to imply that the actions have to be carried out in the order mentioned. Instead, the actions may be carried out in any suitable order other than the order mentioned. Further, some action/actions may be optional.

The embodiments herein are not limited to the above described examples. Various alternatives, modifications and equivalents may be used. Therefore, the above examples should not be taken as limiting the scope of the invention, which is defined by the appending claims.

The invention claimed is:

1. A method, in a radio network node, for handling of changing a primary cell from a first cell to a second cell during re-selection of the primary cell of a user equipment, wherein the radio network node is configured to serve the first cell, wherein the user equipment is located within the first cell and served by the radio network node, wherein the radio network node and the user equipment are comprised in a communications system, the method comprising:
   when the radio network node knows that the user equipment is synchronized with the second cell, transmitting an RRCConnectionReconfiguration signal to the user equipment, the RRCConnectionReconfiguration signal comprising an indication that the user equipment does not need to perform a random access procedure for the second cell when changing the primary cell from the first cell to the second cell.

2. The method of claim 1, further comprising:
   receiving an acknowledgement from the user equipment that acknowledges receipt of the RRCConnectionReconfiguration signal; and
   transmitting uplink allocation information for the second cell to the user equipment.

3. The method of claim 2, wherein the uplink allocation information comprises an uplink allocation that defines uplink resources the user equipment may use for uplink transmission.

4. The method of claim 1, wherein the radio network node further is configured to serve the second cell.

5. The method of claim 1, wherein the indication is comprised in a control information element of the RRCConnectionReconfiguration signal.

6. The method of claim 5, wherein the control information element is a mobility control information element of the RRCConnectionReconfiguration signal.

7. The method of claim 6, wherein the indication is comprised in a rach-ConfigDedicated information element of the mobility control information element.

8. The method of claim 1, further comprising setting a timer value to a value that is smaller than a default value because no random access procedure is needed to be performed.

9. The method of claim 1:
wherein the radio network node is a first radio network node serving the first cell;
wherein the second cell is served by a second radio network node;
wherein the method further comprises transmitting information to the second radio network node that informs the second radio network node that the user equipment is not to perform the random access procedure.

10. The method of claim 9, wherein transmitting the information to the second radio network node comprises transmitting the information together with a sequence number status transfer message to the second radio network node.

11. The method of claim 1, wherein the first cell operates in a frequency band, and the second cell operates in a different frequency band.

12. The method of claim 1, comprising, based on transmitting the indication, refraining from transmitting a timing advance.

13. The method of claim 1, wherein the radio network node is a base station.

14. The method of claim 1, wherein the radio network node knows that the user equipment is synchronized with the second cell when the radio network node knows the user equipment is uplink synchronized with a radio network node serving the second cell.

15. A method, in a user equipment, for changing a primary cell from a first cell to a second cell during re-selection of the primary cell of the user equipment, wherein a radio network node is configured to serve the first cell, wherein the user equipment is located within the first cell and served by the radio network node, wherein the radio network node and the user equipment are comprised in a communications system, the method comprising:
when the radio network node knows that the user equipment is synchronized with the second cell, receiving an RRCConnectionReconfiguration signal from the radio network node, the RRCConnectionReconfiguration signal comprising an indication that the user equipment does not need to perform a random access procedure for the second cell when changing the primary cell from the first cell to the second cell.

16. The method of claim 15, further comprising:
transmitting an acknowledgement to the radio network node that acknowledges receipt of the RRCConnectionReconfiguration signal; and
receiving uplink allocation information for the second cell from the radio network node.

17. The method of claim 15:
wherein the second cell is served by the radio network node; and
wherein the method further comprises transmitting an RRCConnectionReconfigurationComplete signal to the radio network node, wherein the RRCConnectionReconfigurationComplete signal is transmitted based on the received uplink allocation information.

18. The method of claim 15:
wherein the radio network node is a first radio network node serving the first cell;
wherein the second cell is served by a second radio network node;
wherein the method further comprises transmitting an RRCConnectionReconfigurationComplete signal to the second radio network node, wherein the RRCConnectionReconfigurationComplete signal is transmitted based on the received uplink allocation information.

19. The method of claim 15, wherein the method comprises changing the primary cell from the first cell to the second cell in accordance with the indication.

20. A radio network node for handling of changing a primary cell from a first cell to a second cell during re-selection of the primary cell of a user equipment, wherein the radio network node is configured to serve the first cell, wherein the user equipment is located within the first cell and served by the radio network node, wherein the radio network node and the user equipment are comprised in a communications system, and wherein the radio network node comprising a processor and a memory, the memory containing instructions executable by the processor whereby the radio network node is configured to:
when the radio network node knows that the user equipment is synchronized with the second cell, transmit an RRCConnectionReconfiguration signal to the user equipment, wherein the RRCConnectionReconfiguration signal comprises an indication that the user equipment does not need to perform a random access procedure for the second cell when changing the primary cell from the first cell to the second cell.

21. The radio network node of claim 20, wherein the memory contains instructions executable by the processor whereby the radio network node is configured to:
receive an acknowledgement from the user equipment that acknowledges receipt of the RRCConnectionReconfiguration signal; and
transmit uplink allocation information for the second cell to the user equipment.

22. The radio network node of claim 21, wherein the uplink allocation information comprises an uplink allocation that defines uplink resources the user equipment may use for uplink transmission.

23. The radio network node of claim 20, wherein the radio network node further is configured to serve the second cell.

24. The radio network node of claim 20, wherein the indication is comprised in a control information element of the RRCConnectionReconfiguration signal.

25. The radio network node of claim 24, wherein the control information element is a mobility control information element of the RRCConnectionReconfiguration signal.

26. The radio network node of claim 25, wherein the indication is comprised in a rach-ConfigDedicated information element of the mobility control information element.

27. The radio network node of claim 20, wherein the memory contains instructions executable by the processor whereby the radio network node is configured to set a timer value to a value that is smaller than a default value since no random access procedure is needed to be performed.

28. The radio network node of claim 20:
wherein the radio network node is a first radio network node serving the first cell;

wherein the second cell is served by a second radio network node; and wherein the memory contains instructions executable by the processor whereby the radio network node is configured to transmit information to the second radio network node that informs the second radio network node that the user equipment is not to perform the random access procedure.

29. The radio network node of claim 28, wherein the memory contains instructions executable by the processor whereby the radio network node is configured to transmit the information together with a sequence number status transfer message to the second radio network node.

30. A user equipment for changing a primary cell from a first cell to a second cell during re-selection of the primary cell of the user equipment, wherein a radio network node is configured to serve the first cell, wherein the user equipment is located within the first cell and served by the radio network node, wherein the radio network node and the user equipment are comprised in a communications system, and wherein the user equipment comprising a processor and a memory, the memory containing instructions executable by the processor whereby the user equipment is configured to:

when the radio network node knows that the user equipment is synchronized with the second cell, receive an RRCConnectionReconfiguration signal from the radio network node, the RRCConnectionReconfiguration signal comprising an indication that the user equipment does not need to perform a random access procedure for the second cell when changing the primary cell from the first cell to the second cell.

31. The user equipment of claim 30 wherein the memory contains instructions executable by the processor whereby the user equipment is configured to:

transmit an acknowledgement to the radio network node that acknowledges receipt of the RRCConnectionReconfiguration signal;

receive uplink allocation information for the second cell from the radio network node.

32. The user equipment of claim 30:

wherein the second cell is served by the radio network node;

wherein the memory contains instructions executable by the processor whereby the user equipment is configured to transmit an RRCConnectionReconfigurationComplete signal to the radio network node, with the transmission of the RRCConnectionReconfigurationComplete signal based on the received uplink allocation information.

33. The user equipment of claim 30:

wherein the radio network node is a first radio network node serving the first cell;

wherein the second cell is served by a second radio network node;

wherein the memory contains instructions executable by the processor whereby the user equipment is configured to transmit an RRCConnectionReconfigurationComplete signal to the second radio network node, with the transmission of the RRCConnectionReconfigurationComplete signal based on the received uplink allocation information.

* * * * *